(12) United States Patent
Ribes et al.

(10) Patent No.: US 6,243,189 B1
(45) Date of Patent: Jun. 5, 2001

(54) INEXPENSIVE, HIGH QUALITY SCANNING SYSTEM

(76) Inventors: Alfonso Carlos Ribes, 253 Pineland Place, Waterloo, Ontario (CA), N2T 2S4; Arthur Edward Dixon, 601 Stonebury Cr., Waterloo, Ontario (CA), N2K 3R2; Savvas Damaskinos, 8 Lennox Cr., Waterloo, Ontario (CA), N2N 2H3

( * ) Notice: Subject to any disclaimer, the term of this patent is extended or adjusted under 35 U.S.C. 154(b) by 0 days.

(21) Appl. No.: 09/294,308

(22) Filed: Apr. 20, 1999

(51) Int. Cl.$^7$ .................................................. G02B 26/08
(52) U.S. Cl. .................. 359/201; 359/202; 359/221; 359/399
(58) Field of Search ..................... 359/201–202, 359/368, 399, 423, 434, 196, 212, 220, 221, 226

(56) References Cited

U.S. PATENT DOCUMENTS

| | | | |
|---|---|---|---|
| 1,343,025 | * 6/1920 | Barr | 359/423 |
| 3,722,979 | * 3/1973 | Mikami | 359/423 |
| 4,893,008 | * 1/1990 | Horikawa | 359/205 |
| 4,997,242 | 3/1991 | Amos . | |
| 5,381,224 | 1/1995 | Dixon et al. . | |
| 5,414,551 | * 5/1995 | Okzaki et al. | 359/205 |
| 5,532,873 | 7/1996 | Dixon . | |
| 5,726,793 | * 3/1998 | Boardman et al. | 359/205 |
| 5,760,951 | 6/1998 | Dixon et al. . | |
| 6,034,804 | * 3/2000 | Bashkansky | 359/205 |

OTHER PUBLICATIONS

A.E. Dixon et al., "A new confocal scanning beam laser MACROscope using a telecentric, f–theta laser scan lens", Journal of Microscopy, vol. 178, Part 3, Jun. 1995, pp. 261–266.

A.C. Ribes et al., "Photoluminescence imaging of porous silicon using a confocal scanning laser macroscope/microscope", Applied Physics Letters, 66(18), May 1, 1995, pp. 2321–2323.

A.C. Ribes et al., "Reflected–light, photoluminescence and OBIC imaging of solar cells using a confocal scanning laser MACROscope/microscope", Solar Energy Materials and Solar Cells, vol. 44, No. 4; Dec. 15, 1996; p.439–50.

W.J. Smith, "Modern optical engineering—The design of optical systems", 2nd Edition, (McGraw–Hill, New York, 1990), Chapter 13. (No Month).

\* cited by examiner

Primary Examiner—James Phan

(57) ABSTRACT

The present invention provides an inexpensive, simple, compact, optical relay for use primarily with scanning beam imaging systems. More specifically, it can be used as an optical interconnect between scanning mirrors and between a scanning mirror and imaging optics such as a microscope objective. The optical relay, also known as an optical telescope or coupler, consists of two eyepieces forming an afocal assembly. A beam pivoting about a stationary point in the first focal plane of the first eyepiece will be relayed through the optical system such that it pivots about a stationary point at the second focal plane of the second eyepiece. In the preferred embodiment a collimated beam pivots about the first focal point of the first eyepiece as it enters the optical relay, and exits the optical relay with the same beam diameter and scan angle (opposite sign) pivoting about the second focal point of the second eyepiece.

10 Claims, 11 Drawing Sheets

INEXPENSIVE, HIGH QUALITY SCANNING SYSTEM

BACKGROUND—FIELD OF INVENTION

The invention relates to scanning beam imaging optics with particular emphasis on confocal microscopy and macroscopy.

BACKGROUND—DISCUSSION OF PRIOR ART

Optical telescopes used as relay optics or optical couplers must be well-corrected to function properly. This is especially true in confocal microscopy where even small aberrations can result in large imaging errors. High quality plan apochromatic telescopes generally imply a high cost. In practice, high quality telescopes are not used in scanning beam imaging as individual components, rather they form part of pre-existing conventional wide-field microscopes. Telescopes made with singlets, achromatic doublets, or spherical mirrors are inexpensive but only work with very small beam diameters and scan angles. Telescopes constructed with off-axis parabolic mirrors (Amos, U.S. Pat. No. 4,997,242) provide operation for beam diameters and scan angles larger than achromats but are difficult to manufacture with high tolerances without increasing costs significantly. Mirrors tend to degrade with time and are generally less light efficient than refractive optics.

OBJECTS AND ADVANTAGES

The present invention provides an inexpensive, high quality optical assembly consisting of two eyepieces. Microscope and telescope eyepieces are readily available at low cost and high optical quality due to mass production and extensive demand. When combined, eyepieces provide an optical relay with large working distances (front and back) since eye relief distances tend to be greater than 1.5 cm. Eyepieces are most commonly used as part of wide-field microscopes which are in turn used as part of scanning systems. The combination of the tube lens and the eyepiece, in infinity-corrected microscope systems, form an optical relay or telescope. The advantage of the present invention is that it is less costly than a complete microscope system, it is well corrected for aberrations, it is compact and has the flexibility to be implemented in many systems. When large eyepieces, such as those used with telescopes, are implemented in the present invention, this allows for beam sizes (>5 mm) larger than normally encountered in microscopic systems. Many microscope systems are not designed as scanning microscopes and therefore the present invention provides superior optical performance at a much reduced cost and much greater flexibility. Further objects and advantages will become apparent from consideration of the ensuing description and drawings.

BRIEF DESCRIPTIONS OF THE DRAWINGS

LIST OF REFERENCE NUMERALS

Figure 1:
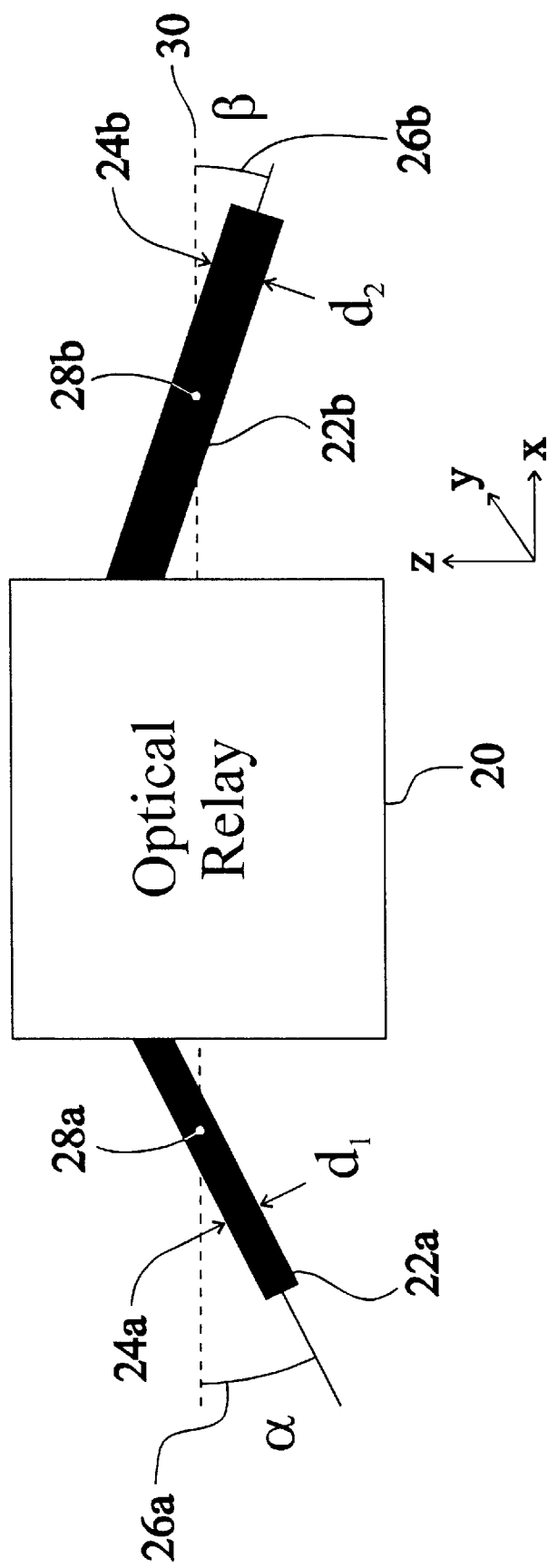
FIG. 1 shows a generic or generalized optical relay.

| | |
|---|---|
| 20 | Optical relay |
| 20a | First optical relay |
| 20b | Second optical relay |
| 22a | Collimated entrance beam |
| 22b | Collimated exit beam |
| 24a | Entrance beam diameter |
| 24b | Exit beam diameter |
| 26a | Entrance beam scan angle |
| 26b | Exit beam scan angle |
| 28a | Entrance pivot point |
| 28b | Exit pivot point |
| 29 | First focal point of eyepiece |
| 30 | Optic axis |
| 32a | Front focal plane |
| 32b | Back focal plane |
| 34a | First principal plane |
| 34b | Second principal plane |
| 36a | Front working distance or eye relief |
| 36b | Back working distance |
| 38 | Eyepiece |
| 40a | First eyepiece |
| 40b | Second eyepiece |
| 42a | First focal plane of first eyepiece |
| 42b | Second focal plane of second eyepiece |
| 44 | Right-angle beam cone |
| 46 | Common focal point |
| 48 | Common focal plane |
| 50a | First focal plane of first eyepiece |
| 50b | Second focal plane of second eyepiece |
| 52a | First principal plane of first eyepiece |
| 52b | Second principal plane of first eyepiece |
| 54a | First principal plane of second eyepiece |
| 54b | Second principal plane of second eyepiece |
| 56a | Focal length of first eyepiece |
| 56b | Focal length of second eyepiece |
| 60a | Axis of rotation of first scan mirror |
| 60b | Axis of rotation of second scan mirror |
| 62a | First scan mirror |
| 62b | Second scan mirror |
| 64 | Optical system |
| 66a | First achromatic doublet |
| 66b | Second achromatic doublet |
| 68a | First focal point of first achromatic doublet |
| 68b | Second focal point of second achromatic doublet |
| 70 | Ideal thin lens |
| 72a | Focal point of first off-axis parabolic mirror |
| 72b | Focal point of second off-axis parabolic mirror |
| 74a | First off-axis parabolic mirror |
| 74b | Second off-axis parabolic mirror |
| 80a | First Erfle eyepiece |
| 80b | Second Erfle eyepiece |
| 82a | First focal point of first Erfle eyepiece |
| 82b | Second focal point of second Erfle eyepiece |

SUMMARY OF INVENTION

The present invention provides an inexpensive, simple, compact optical relay for use primarily with scanning beam imaging systems. The optical relay, which is also known as an optical telescope or optical coupler, consists of two telescope or microscope eyepieces forming an afocal assembly. A beam pivoting about a stationary point in the first focal plane of the first eyepiece will be relayed through the optical system such that it pivots about a stationary point on the second focal plane of the second eyepiece. In the preferred embodiment a collimated beam is pivoted about the first focal point (on the optic axis) of an eyepiece. The beam passes through the first and second eyepieces which form a 1:1 relay, or a unitary telescope, in the preferred embodiment. The emerging beam pivots about the second focal point of the second eyepiece. The entrance and emerging beams have the same diameters and pivot angles (opposite sign). This optical relay can be used with a wide variety of entrance beam diameters and angles while still providing a high quality exit beam. The key to the success of the present invention is due to economics rather than optics. Telescopes and microscopes are found in large numbers throughout the world and, therefore, so are their corresponding eyepieces. Designs for most commonly used eyepieces have been established for many decades. Eyepiece manufacturers therefore enjoy low design costs and utilize mass production and economies of scale to produce high quality, low cost eyepieces. The use of commercial eyepieces in the present invention provides for a high quality, inexpensive optical telescope. The wide variety and availability of eyepieces allows for a flexible relay optic design with a wide degree magnification, entrance/exit beam diameter, and entrance/exit beam angle possibilities.

The present invention is intended, but not exclusively, to be used in scanning beam instruments; specifically as an optical relay between scanning mirrors and as an optical relay between a scanning mirror and an objective lens. One common way to do scanning beam imaging is to pivot a beam with a scanning mirror in one direction and then pivot the same beam in a perpendicular direction. Since both mirrors cannot physically pivot about the same point, a relay lens is required to superimpose the scan from one mirror onto the center of rotation of the other mirror. A related application is a relay between a scanning mirror and an objective lens. Most microscope objectives have their entrance pupils and their first focal points located inside or at the end of the barrel, making it physically impossible to insert a scanning mirror. The present invention can be used to 'insert' a pivoting beam at the entrance pupil and/or at the first focal plane of an infinity-corrected microscope objective.

DESCRIPTION OF INVENTION

The present invention consists of a pair of eyepieces arranged in an afocal assembly. This assembly acts as a high quality, inexpensive, and compact optical relay for use primarily in scanning beam imaging instrumentation. The optical quality is such that it can also be used in confocal scanning beam imaging systems.

FIG. 1 shows a generic or generalized optical relay 20. The optical relay can consist of any combination of lenses, mirrors, diffractive optics, etc. A collimated beam of light 22a with beam diameter 24a equal to $d_1$ enters the optical relay. The collimated entrance beam 22a enters the optical relay at an angle 26a equal to $\alpha$ with respect to the optic axis 30. The entrance beam pivots about the entrance pivot point 28a. The purpose of the optical relay is to accept a collimated beam pivoting about a fixed point and relay this motion such that a collimated exit beam 22b (not necessarily the same beam diameter or scan angle) with diameter $d_2$ 24b and scan angle $\beta$ 26b is produced pivoting about the exit pivot point 28b. The beam diameters and scan angles in FIG. 1 are related as follows:

$$d_1/d_2 = \beta/\alpha$$

The optical relay 20 in FIG. 1 is an afocal system, that is, its focal length is infinite. FIG. 1 effectively describes an optical telescope which in its simplest form consists of an objective and an eyepiece. The present invention consists of an optical telescope constructed from unconventional components and utilized as an optical relay in scanning beam microscopy/macroscopy instrumentation. The object is to provide a high quality relay, even by confocal microscopy standards at low cost. A very low cost relay consists of a pair of singlets forming an afocal assembly. Unfortunately the optical quality of such a relay is poor, suffering from all monochromatic and chromatic aberrations. As pointed out by Amos (U.S. Pat. No. 4,997,242) only systems that are well corrected for all aberrations perform well as optical relays. The combination of two eyepieces forming an afocal assembly, and therefore an optical relay, gives the optical combination of lowest cost and the highest optical quality.

Figure 2:
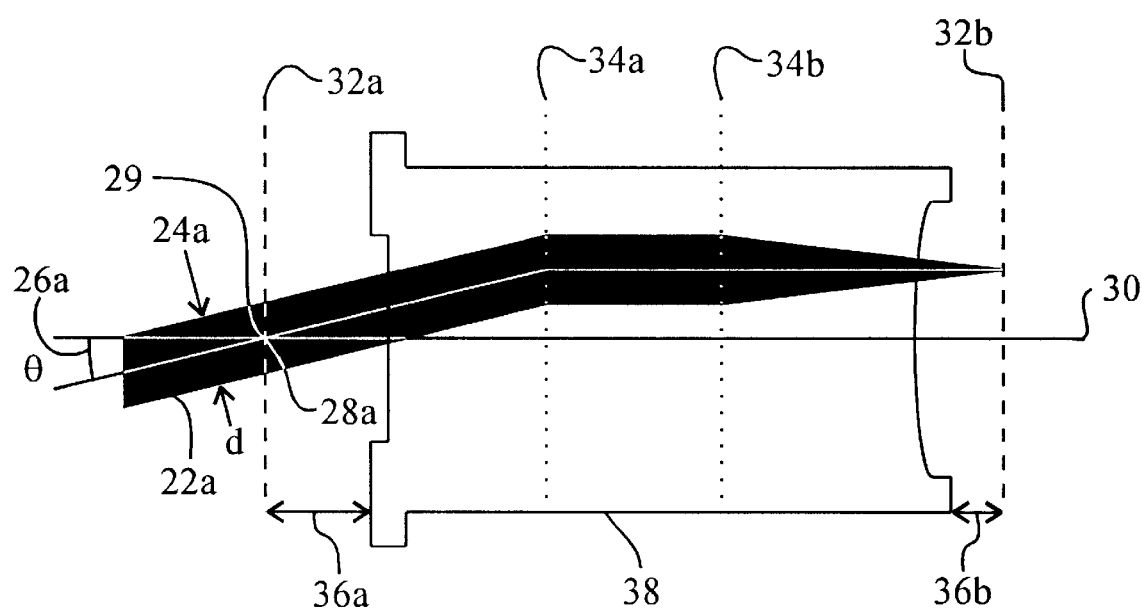
FIG. 2 shows a generic or generalized eyepiece.

FIG. 2 shows a side-on cross-sectional view of a generic or generalized eyepiece 38. There are many types of eyepieces and therefore none of the lens elements making up the eyepiece are shown. Specific eyepiece designs are not part of this invention, rather the high optical quality and low cost of the eyepieces are relevant factors. FIG. 2 therefore shows the eyepiece 38, its first focal plane 32a, its second focal plane 32b, its first principal plane 34a, and its second principal plane 34b. A collimated entrance beam 22a of diameter d 24a enters the eyepiece at angle $\theta$ 26a with respect to the optic axis 30. The collimated beam passes through the entrance pivot point 28a of the eyepiece (also its first focal point 29) which corresponds to the intersection of the optic axis 30 and the first focal plane 32a. Following the graphical solution conventions for a thick lens, the entrance beam 22a comes to focus starting from the second principal plane 34b to the second focal plane 32b. The eyepiece in FIG. 2 is operated telecentrically since the entrance beam 22a pivots about the first focal point 29, hence the beam focuses as a right angle cone perpendicular to the second focal plane 32b. The actual beam path inside the eyepiece will be different from the one shown depending on the specific optical arrangement. There are two more quantities that are useful in defining the eyepiece in FIG. 1: the front working distance (or eye-relief) 36a and the back working distance 36b. The front and back working distances measure the distance from the first and second focal planes 32a, 32b to the nearest eyepiece flange, respectively. The generic eyepiece in FIG. 2 can be one of many types. Some commonly available types are: the Huygens eyepiece, the Ramsden eyepiece, the Kellner eyepiece, the orthoscopic eyepiece, the symmetrical Plössl eyepiece, the Erfle eyepiece, and the Nagler eyepiece. From the list above, the Nagler eyepiece is the best with respect to optical quality and consequently the most expensive. Other types of eyepieces, are available commercially but are not as common as the seven listed above. Many combinations of eyepieces which minimize cost and maximize optical quality are possible depending on the imaging application. In confocal microscopy high optical quality is essential and the relay would most likely be assembled with Erfle or better eyepieces. For example, an Erfle eyepiece might be rated to operate over a 60° field of view under 'normal' conditions, but when used in a confocal microscope it might only be suitable for a 5° scan angle.

Figure 3:
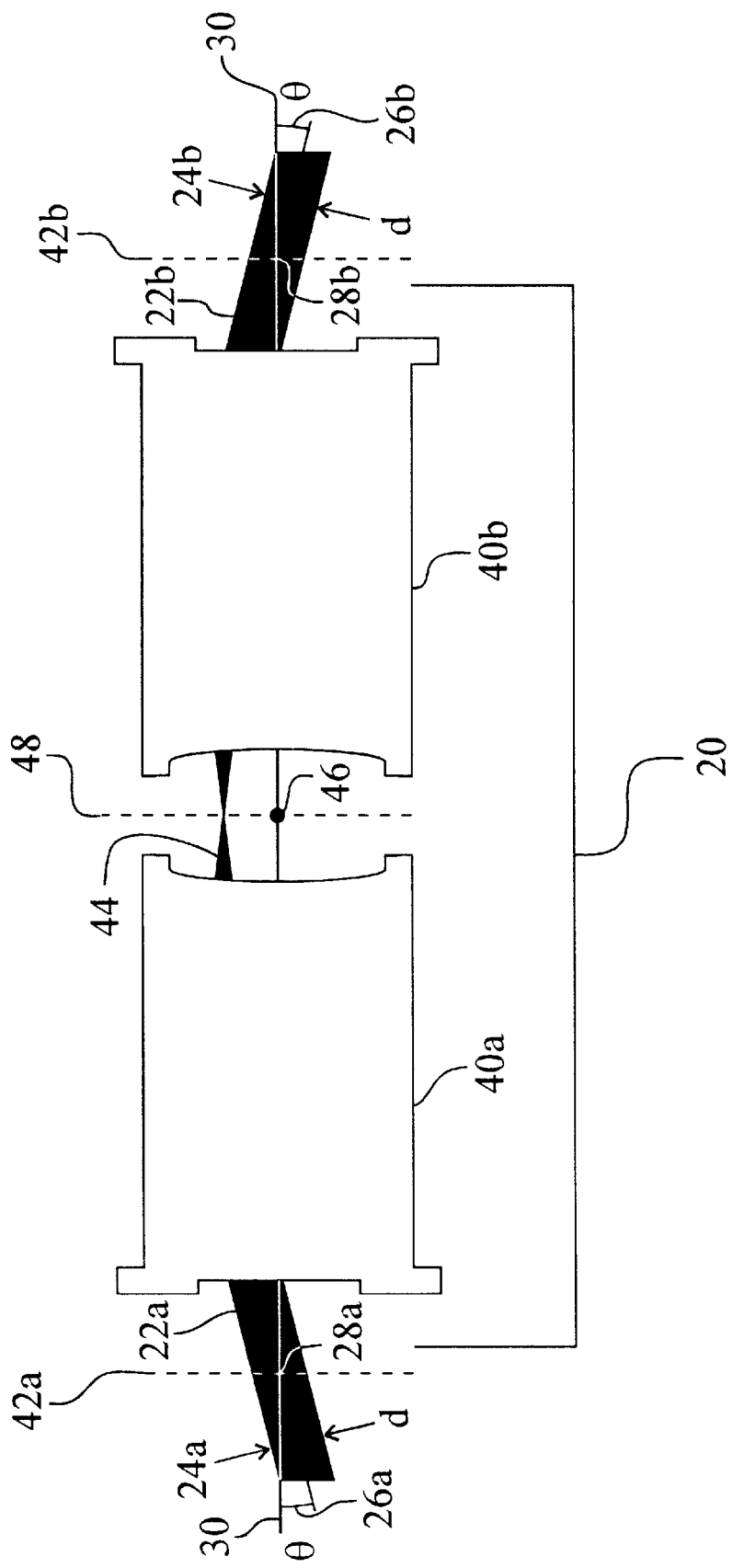
FIG. 3 shows a 1:1 optical relay, coupler, or unitary telescope made up of two identical eyepieces.

FIG. 3 shows a 1:1 optical relay 20 made up of identical eyepieces 40a, 40b positioned back-to-back in an afocal assembly. FIG. 3 consists of the same arrangement as FIG. 2 in addition to its mirror image about the second focal plane 32b. In FIG. 3 the collimated entrance beam 22a (diameter d 24a) enters the first eyepiece 40a at an entrance angle θ 26a with respect to the optic axis 30. The entrance beam 22a pivots about the entrance pivot point 28a of the first eyepiece 40a which corresponds to the intersection of the optic axis 30 with the first focal plane 42a of the first eyepiece 40a. The scanning beam exits the first eyepiece as a telecentric, right angle cone 44 coming to focus at the common focal plane 48. The eyepieces 40a, 40b have a common focal point 46. By symmetry, the beam path after the common focal plane 48 is a mirror image of the entrance beam path. The exit beam 22b exits the second eyepiece 40b with an exit angle θ 26b identical to the entrance beam angle 26a but with opposite sign. The exit beam 22b pivots about the exit pivot point 28b. The entrance beam 22a slopes up while the exit beam 22b slopes down. A unitary telescope, such as the one in FIG. 3, has the advantage of having zero coma, distortion, and lateral colour aberration due to the symmetry principal. Also, it acts like a 'true' optical relay since it does not magnify the entrance beam nor does it affect the scan angle. The entrance beam 22a is relayed from one point 28a to another 28b, as required.

Figure 4:
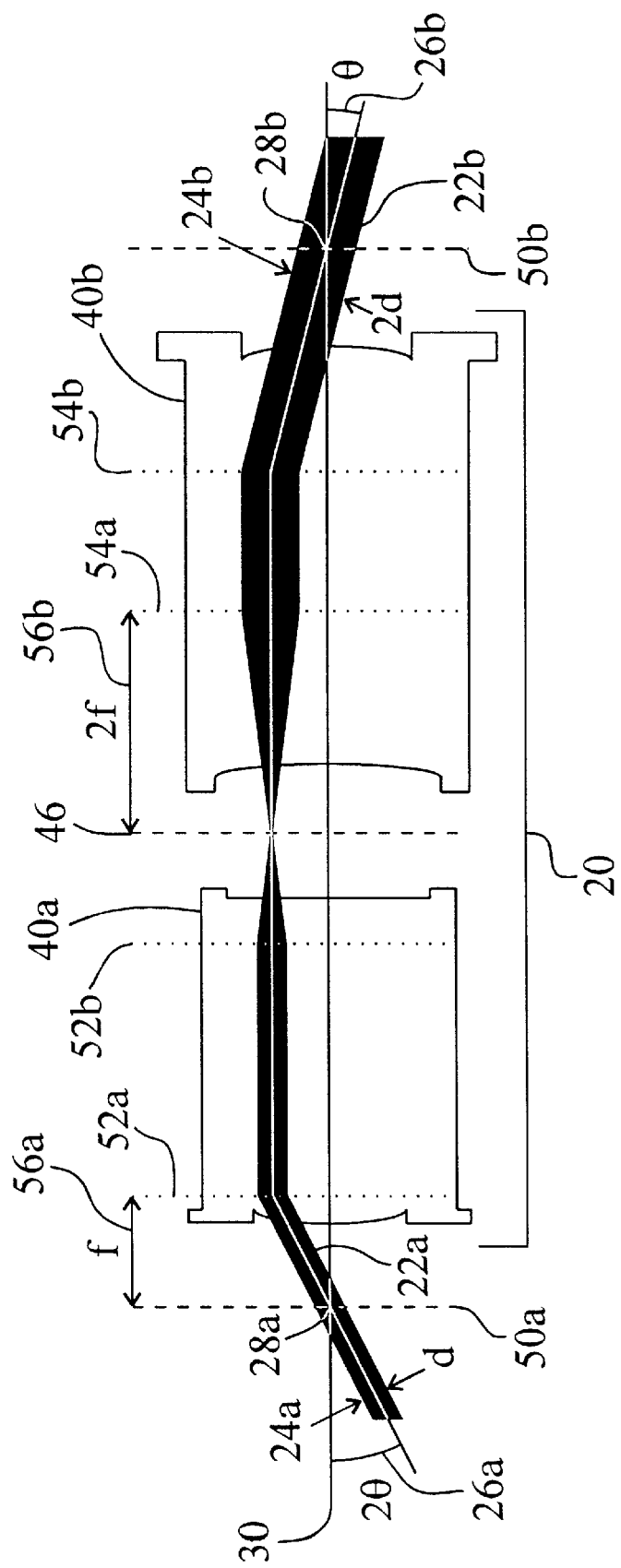
FIG. 4 shows a 1:2 optical relay, coupler, or non-unitary telescope made up of two eyepieces.

FIG. 4 shows a side-on cross-sectional view of a 1:2 optical relay 20, or non-unitary telescope made up of two non-identical eyepiece 40a, 40b forming an afocal arrangement. In this particular case, the second eyepiece 40b has a focal length 56b double that of the first eyepiece 40a such that a 1:2 optical relay is formed. A collimated entrance beam 22a with diameter d 24a pivots about the entrance pivot point 28a. The entrance beam scan angle 26a is 2θ. In order to fully illustrate the non-unitary relay optical operation in FIG. 4 the focal lengths 56a, 56b and the principal planes 52a, 52b, 54a, 54b are shown for both eyepieces 40a, 40b, respectively. The entrance beam 22a enters the first eyepiece 40a of focal length f 56a and comes to focus telecentrically at the common focal plane 46. The beam then diverges as a right angle cone and enters the second eyepiece 40b of focal length 2f 56b. The exit beam 22b has a diameter 2d 24b and pivots about the exit pivot point 28b. The exit beam scan angle 26b has been reduced to θ. In general, the exit beam scan angle will be reduced by the exit beam diameter expansion factor (2 in this case). Non-unitary relays add a great deal of flexibility to the overall design of scanning beam systems allowing components with different scan angle and beam diameter requirements to be successfully coupled.

Figure 5:
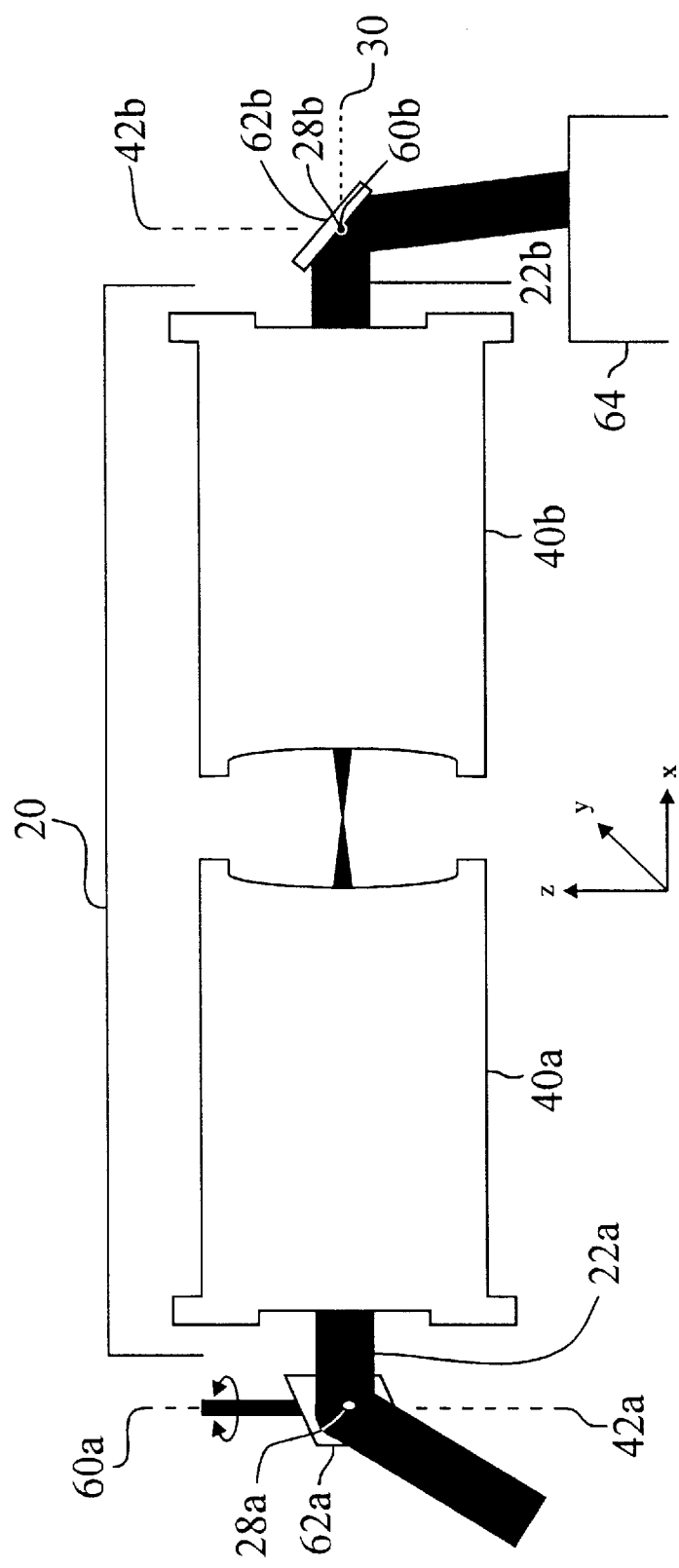
FIG. 5 shows a unitary telescope acting as an optical relay between two scanning mirrors.

FIG. 5 shows a 1:1 optical relay 20 inserted between two scan mirrors 62a, 62b. Two identical eyepieces 40a, 40b form an afocal unitary telescope assembly. The center of each scanning mirror is coincident with the entrance and exit pivot points 28a, 28b of the relay 20, respectively. The axis of rotation 60a of the first scan mirror 62a lies on the first focal plane 42a of the first eyepiece 40a. The pivoting motion of the entrance beam 22a is relayed such that the exit beam 22b pivots about a stationary point, namely, the exit pivot point 28b. The center of the second scanning mirror is coincident with the stationary pivot point 28b. The axis of rotation for the second scanning mirror 60b is in the second focal plane 42b of the second eyepiece 40b and it is perpendicular to the axis of rotation 60a of the first scan mirror 62a. As the exit beam 22b strikes the second scan mirror 62b, it can pivot in all directions while entering the next set of optics 64 which can consist of a laser scan lens, an eyepiece and microscope objective combination, another optical relay, etc. The first scan mirror 62a scans the entrance beam 22a in the x-y plane, while the second scan mirror causes the exit beam 22b to move in the x-z plane.

Figure 6:
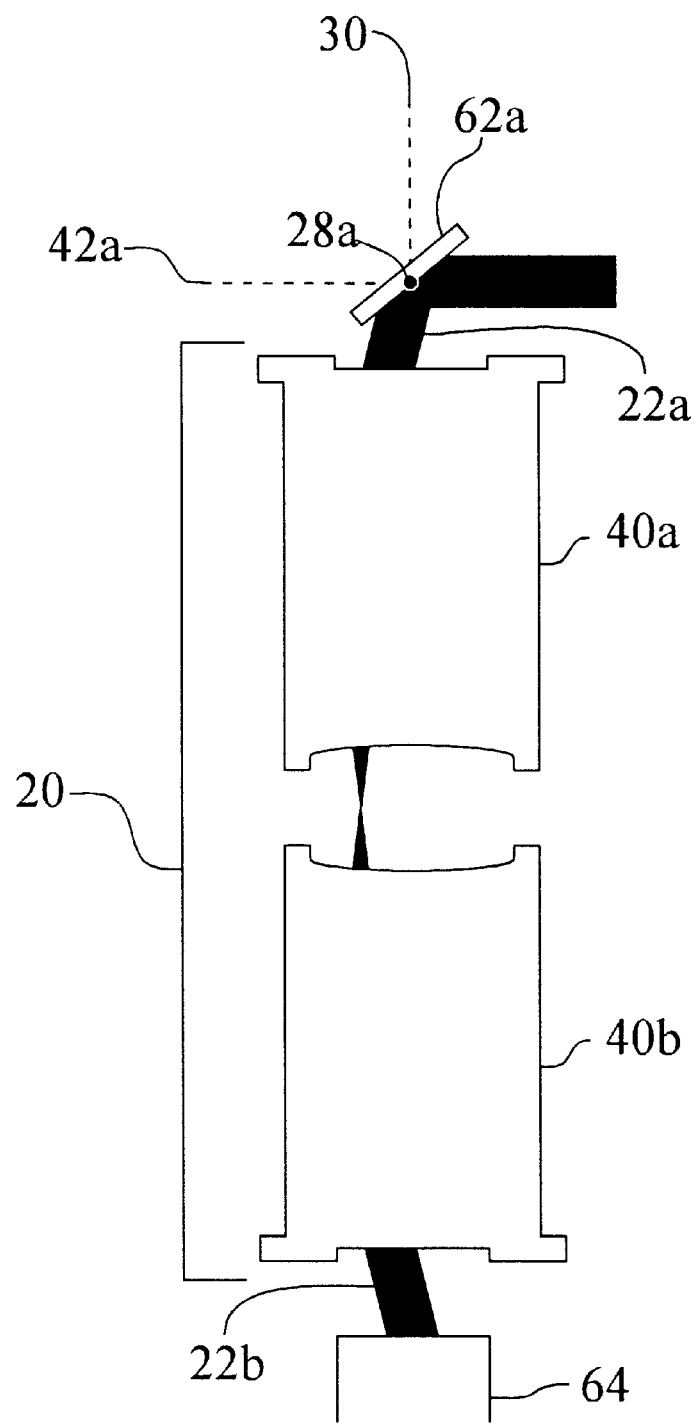
FIG. 6 shows a unitary telescope acting as an optical relay between a scanning mirror and an optical system.

FIG. 6 shows a 1:1 optical relay 20 inserted between a scan mirror 62a and an optical system 64. The entrance beam 22a is deflected by the scan mirror 62a and enters the first eyepiece 40a. The center of the scan mirror is coincident with the entrance pivot point 28a (this corresponds to the first focal point of the first eyepiece). If the optical system is, for example, an infinity-corrected microscope objective then the exit beam 22b will pivot at the entrance pupil of said objective. An infinity-corrected microscope objective is made to accept a collimated beam pivoting about its entrance pupil at various scan angles and produce a diffraction-limited spot on the specimen being viewed.

Figure 7:
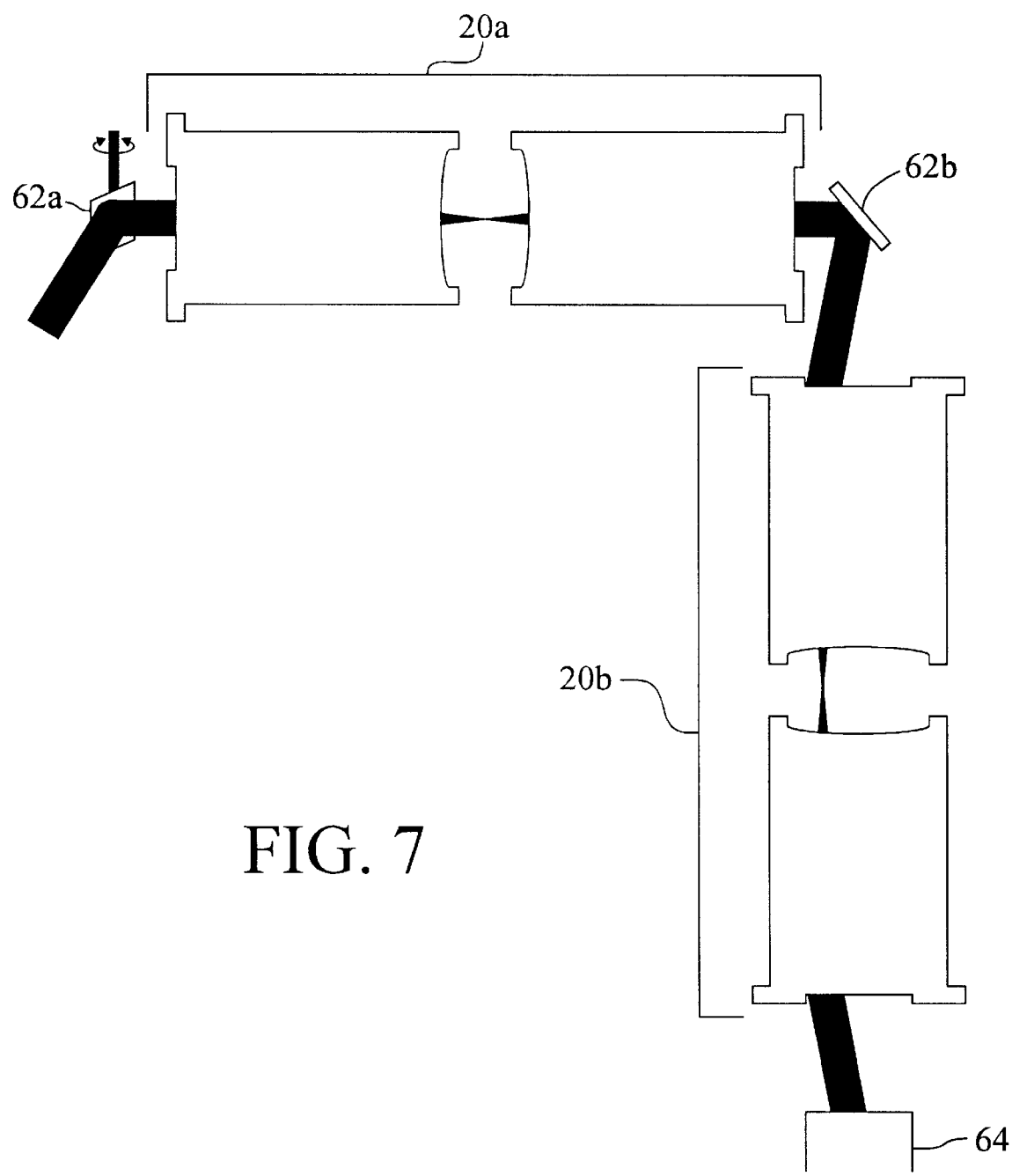
FIG. 7 shows two scan mirrors connected by a 1:1 optical relay, in turn connected to an optical system by a 1:1 optical relay.

FIG. 7 shows a scan mirror 62a optically coupled by a first optical relay 20a to a second scan mirror 62b which in turn is optically coupled to an optical system 64 via a second optical relay 20b.

Figure 8:
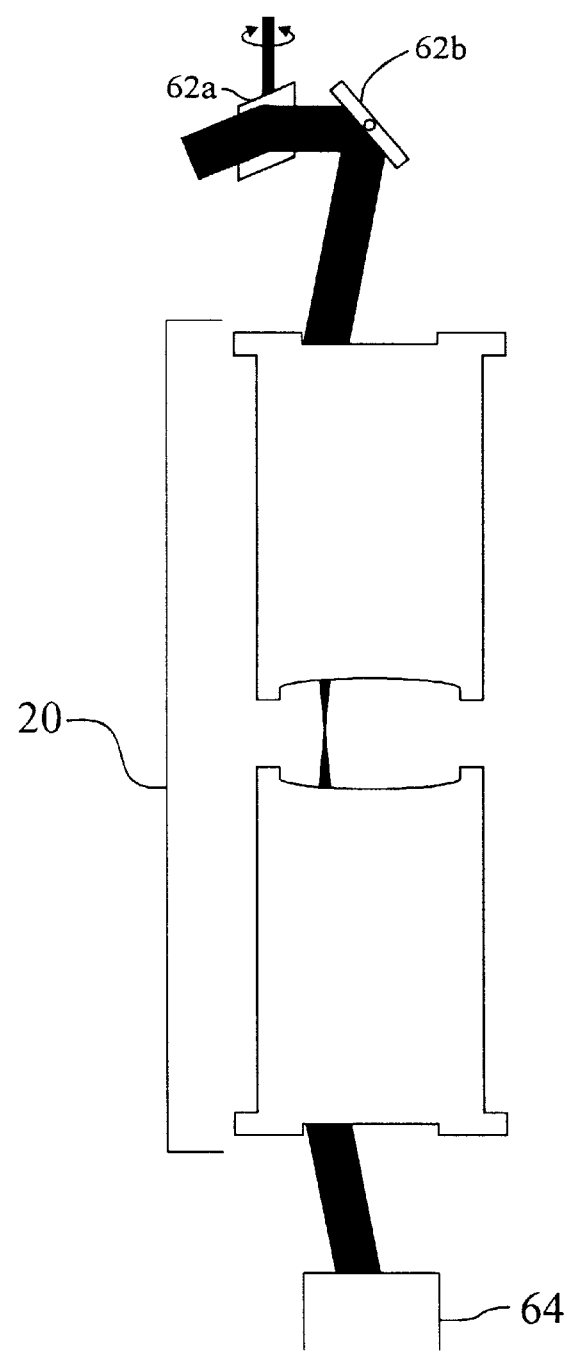
FIG. 8 shows two scan mirrors and an optical system connected by a 1:1 optical relay.

FIG. 8 shows two closely spaced scan mirrors 62a, 62b optically coupled to an optical system 64 via an optical relay 20.

Figure 9:
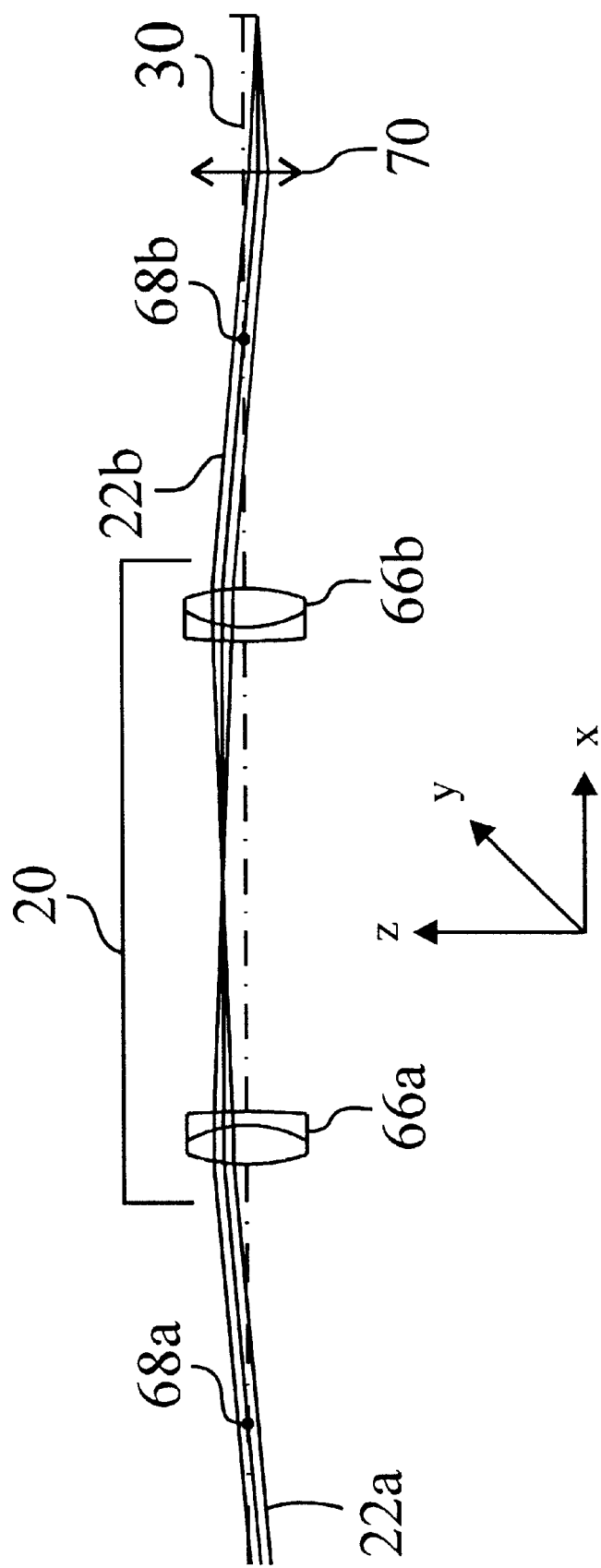
FIG. 9 shows a unitary telescope made up of two Melles Griot LAO037 achromatic doublets.
Figure 10:
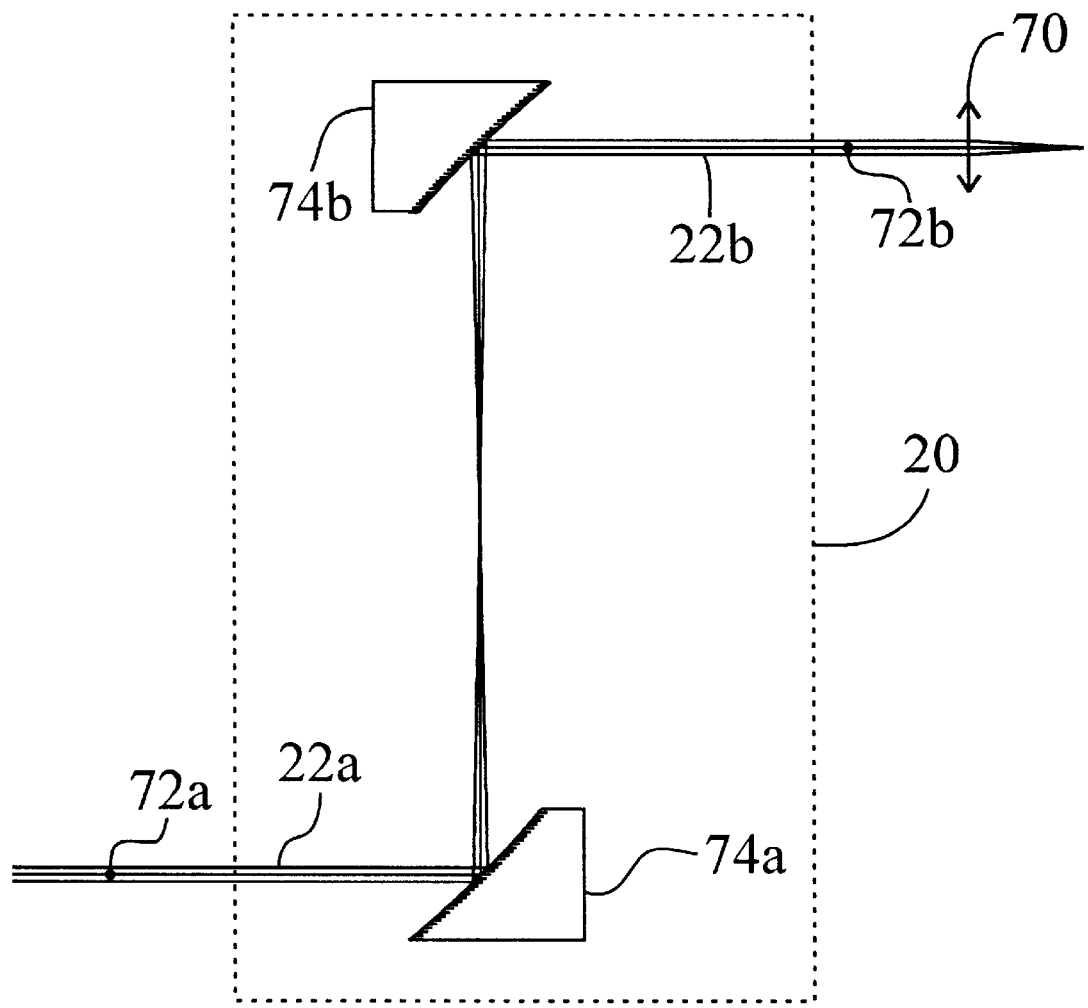
FIG. 10 shows a unitary telescope made up of two 90°, off-axis parabolic mirrors.
Figure 11:
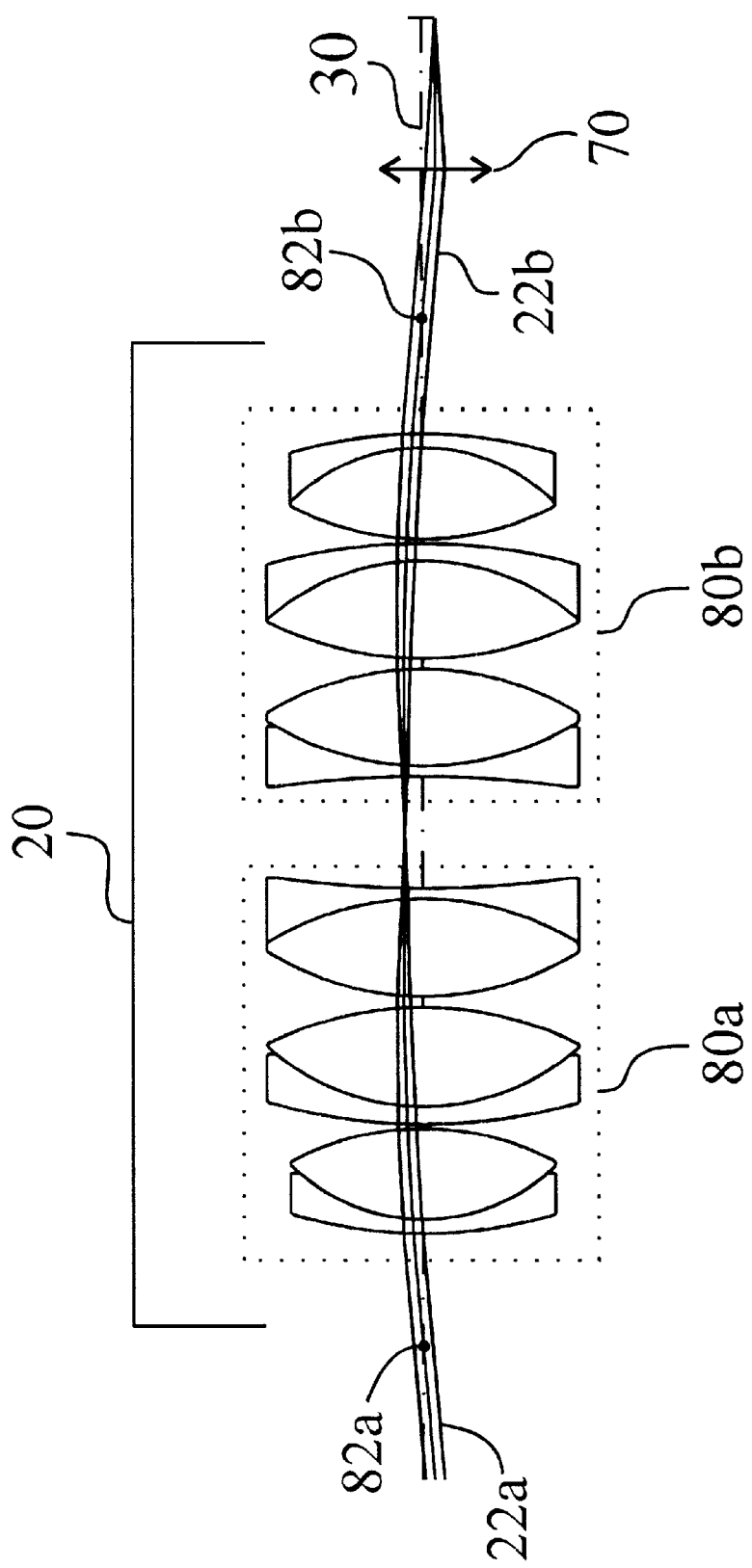
FIG. 11 shows a unitary telescope made up of two Edmund Scientific Erfle eyepieces.

FIGS. 9, 10, and 11 show 1:1 optical relays consisting of a pair of achromatic doublets, off-axis parabolic mirrors, and Erfle eyepieces, respectively. The optical relays of FIGS. 9, 10, and 11 were chosen to have similar overall optical lengths, in addition to the same entrance pupil diameters (3 mm), the same field angle coverage (0°, 2°, 3°, 4°, and 5°), and the same wavelength coverage (486.1, 587.6, and 656.3 nm). By using identical operating parameters a fair comparison is made between the optical relays of FIGS. 9, 10, and 11 using CODE V, a lens analysis and design program. CODE V cannot analyze afocal systems directly and therefore inserts an ideal lens with no aberrations. This transforms the afocal system into a focal system which can be readily analyzed with CODE V. Before showing the performance results for each of the systems in FIGS. 9, 10, and 11, each system will be described in more detail.

FIG. 9 shows a 1:1 optical relay consisting of two Melles Griot LAO034 (effective focal length=36 mm) achromatic doublets 66a, 66b arranged in an afocal assembly. The doublets are positioned such that the sides with the highest degree of curvature face away from each other in order to minimize spherical aberration. The 3 mm diameter entrance beam 22a pivots about the first focal point 68a of the first doublet lens 66a. The beam consists of equal weights of 486.1, 587.6, and 656.3 nm wavelengths (blue, green, and red). FIG. 9 shows the beam pivoting with a 5° y-field angle, that is, the beam pivots about the y-axis in the x-z plane (the plane of this drawing). The exit beam 22b pivots about the second focal point 68b of the second doublet 66b and is focused by an ideal lens 70 with an f-number equal to eight.

FIG. 10 shows a 1:1 optical relay consisting of two 90° off-axis parabolic mirrors 74a, 74b with 25.4 mm parent focal lengths and 50.8 mm effective focal lengths forming an afocal assembly. A collimated 3 mm diameter entrance beam 22a pivots about the first effective focal point 72a of the first off-axis parabolic mirror 74a. The exit beam 22b pivots about the second focal point 72b of the second off-axis parabolic mirror 74b and then is focused by an ideal lens 70 with an f-number of eight. FIG. 10 shows the relay with a 0° field angle. The optical relay in FIG. 10 is covered under U.S. Pat. No. 4,997,242 authored by Amos and entitled "Achromatic Scanning System".

FIG. 11 shows a 1:1 optical relay consisting of two Edmund Scientific, Erfle eyepieces 80a, 80b (model no. 41,347) forming an afocal assembly. A collimated, 3 mm diameter entrance beam 22a pivots about the first focal point 82a of the first eyepiece 80a. The exit beam 22b pivots about the second focal point 82b of the second eyepiece 80b and is focused by an ideal lens 70 with an f-number equal to eight.

A quantitative comparison of the quality for each of the optical relays in FIGS. 9, 10, and 11 was done with CODE V by generating encircled energy plots for each relay. In the case of an ideal Airy disk, the diameter of the circle which encloses 84% of the energy corresponds to the Airy disk diameter coincident with the diameter of the first minima. CODE V calculates diameters for 80% encircled energy, which gives a good indication of the extent of the aberrations present. Table 1 below shows 80% encircled energy diameters for each of the optical relays in FIGS. 9, 10, and 11 at 0°, 2°, 3°, 4°, and 5° y-field angles. The 80% encircled energy diameters for the all-reflective relay of FIG. 10 were calculated using the average of the 0°, 2°, 3°, 4°, and 5° x and y-field angles due to the asymmetric nature of the relay. The entrance beam diameter was set to 3 mm for each relay and the beam consisted of an equal weight of 486.1, 587.6, and 656.3 nm wavelengths. These parameters are typically encountered in microscopy and macroscopy. A 'best focus' routine was implemented to minimize the 80% encircled energy diameters for each of the field angles. The 80% encircled energy diameters were therefore not measured at the paraxial focal plane. The diffraction-limited, ideal 80% encircled energy diameter for the table below was calculated to be 8.6 $\mu$m.

TABLE 1

Encircled energy (80%) diameters for the relays in FIGS. 9, 10, and 11.
80% Encircled Energy Diameters ($\mu$m)

| Field Angle | Doublet Relay | Mirror Relay | Eyepiece Relay |
|---|---|---|---|
| 0° | 14.9 | 10.6 | 8.7 |
| 2° | 10.5 | 8.8 | 8.8 |
| 3° | 13.4 | 8.8 | 9.0 |
| 4° | 23.2 | 12.5 | 9.8 |
| 5° | 38.0 | 17.0 | 11.5 |

As expected the results for the doublet relay are poor. Astigmatism and curvature of field primarily contributed to the poor performance of the doublet especially at large field angles. The 5° diameter value, for example, is approximately four times the diffraction-limited value. Although the doublet relay is the least expensive of the group, it is clearly inferior in quality when compared to the mirror and eyepiece relays.

Overall the eyepiece relay exhibits superior performance than the mirror relay. For imaging applications dealing primarily with visible light imaging applications, the eyepiece relay is clearly superior for various reasons:
1) Eyepiece optical relays of equivalent size or compactness provide superior optical performance in the visible.
2) Mirrors tend to degrade in quality with time and need to be recoated frequently, while refractive optics do not degrade in the same time period.
3) The cost of the eyepieces is significantly less than for off-axis parabolic mirrors. For example each mirror in FIG. 10 costs three times as much as each of the eyepieces in FIG. 11.

The mirror relay can only increase or decrease its optical performance quality by changing the off-axis parabolic mirror parent focal lengths. Better performance can only be achieved by increasing the parent focal length thereby making the system less compact. The eyepiece relay offers a much wider degree of flexibility. The relay of FIG. 11 can be made to perform better by substituting the Erfle eyepiece with a more expensive Nagler eyepiece, for example. The relay will retain its original size if a similar focal length Nagler eyepiece is chosen, or it can reduced in size if a smaller focal length is chosen. Similarly, if very high optical quality is not needed then the Erfle eyepieces in FIG. 11 can be replaced with lower cost eyepieces. Virtually any combination is possible when non-unitary relays are considered. For example, a short focal length eyepiece combined with a long focal length achromatic doublet or triplet can serve as an adequate expanding or reducing optical relay since the longer the focal length, the smaller the astigmatism for doublets and triplets. A combination of an eyepiece with a laser scan lens can serve as a good optical relay at a single or limited range of wavelengths since a laser scan lens is well corrected for large scan angles but not usually for colour.

Conclusions, Ramifications, and Scope of Invention

The present invention describes a high optical quality, economical optical relay for use primarily in scanning beam systems. High quality optical relays that connect two scanning mirrors or devices, or that connect a x/y scanning assembly to an imaging lens, such as a microscope objective, tend to be custom-manufactured at a very high cost. A low-cost solution is to utilize a pair of singlets or achromatic doublets in an afocal assembly as an optical relay. While low-cost, such an optical relay suffers from large aberrations especially when used with large beam diameters and scan angles. The preferred embodiment of the present invention uses a pair of eyepieces in an afocal assembly to serve as an optical relay. The reader will see that the present invention provides high optical quality with off-the-shelf, commercially available, stock-item optical components. The present invention has taken advantage of the fact that a great deal of design and optimization has already been performed by eyepiece manufacturers. Mass production and economies of scale have brought the price of high quality eyepieces down to very reasonable levels. Optical analysis and simulations have found that the quality of the present invention is such that it can be used in confocal imaging where highly-corrected optics are essential for proper operation. Telescope eyepieces have been found to work best due to their size, however, microscope eyepieces and eyepieces or oculars from other instruments will also work as well. All the preferred embodiments have eyepieces arranged 'back to back', that is, with the eye relief facing out. Any other afocal arrangements may be used since in some cases this might reduce a particular aberration.

The advantage of having such a wide selection of eyepieces commercially available is that the optical relay can be tailored to fit the needs of a particular scanning system. If this train of thought is extended further then one can see that even greater flexibility can be gained by substituting other optical elements for the eyepieces keeping in mind this will reduce the optical quality to cost ratio. All the preferred embodiments have shown eyepieces as the optical components making up the optical relay. Achromats, triplets, camera lenses, video lenses, laser scan lenses, concave mirrors, etc. may be substituted if very high quality imaging is not required. All preferred embodiments use plane scan mirrors to deflect and steer beams. Other scan systems including rotating polygons, acousto-optic deflectors, etc. may be used.

The above has served to give a good description of the preferred embodiment of the invention. However various modification can be made and the invention can have alternative construction or equivalents. The entire scope of the invention is defined by the following claims.

We claim:

1. A scanning assembly, to be used in a confocal scanning laser microscope, for imparting a one dimensional scan to a collimated incoming beam of laser light, comprising:

a plane mirror rotatable about an axis in the plane of said plane mirror; and an optical element; and first and second telescope eyepieces, disposed optically between said plane mirror and said optical element to define an afocal assembly for transferring light reflected off said plane mirror onto said optical element;

said first and second telescope eyepieces are identical;

said first and second telescope eyepieces arranged back to back such that the back focal points of said first and second telescope eyepieces are coincident, the center of said plane mirror coincident with the front focal point of said first telescope eyepiece, the first focal point of said optical element coincident with the front focal point of said second telescope eyepiece;

whereby said first and second telescope eyepieces combine to provide optimal optical performance, said collimated incoming beam of laser light suffering minimal distortion after traversing said scanning assembly.

2. The scanning assembly of claim 1, wherein said optical element is an infinity corrected microscope objective.

3. The scanning assembly of claim 2, wherein said collimated incoming beam of laser light has a diameter greater than one centimeter; whereby said first and second telescope eyepieces minimize aberrations resulting from using larger beam diameters than conventionally used in confocal microscopes.

4. The scanning assembly of claim 3, wherein said first and second telescope eyepieces are Edmund Scientific Erfle telescope eyepieces, or Nagler telescope eyepieces.

5. A scanning assembly for imparting a one or two dimensional scan to an incoming collimated beam of light, comprising:

a scanning means; and an optical element; and first and second telescope eyepieces, disposed optically between said scanning means and said optical element to define an afocal assembly for transferring light from said scanning means onto said optical element;

said first and second telescope eyepieces are identical;

whereby coma, distortion, and lateral chromatic aberration in said scanning assembly are greatly reduced;

whereby said first and second telescope eyepieces combine to provide optimal optical performance, said incoming collimated beam of light suffering minimal distortion after traversing said scanning assembly.

6. The scanning assembly of claim 5, wherein said optical element is an infinity corrected microscope objective.

7. The scanning assembly of claim 5, wherein said first and second telescope eyepieces are Edmund Scientific Erfle telescope eyepieces, or Nagler telescope eyepieces.

8. A scanning assembly for imparting a one or two dimensional scan to an incoming collimated beam of light, comprising:

a first plane mirror rotatable about a first axis in the plane of said first plane mirror;

a second plane mirror rotatable about a second axis in the plane of said second plane mirror, said second axis being perpendicular to said first axis, said second plane mirror having a mean orientation which is not parallel to the mean orientation of said first plane mirror; and an optical element; and first and second telescope eyepieces, disposed optically between said second plane mirror and said optical element to define an afocal assembly for transferring light from said second plane mirror onto said optical element;

said first and second telescope eyepieces are identical;

whereby said first and second telescope eyepieces combine to provide optimal optical performance, said incoming collimated beam of light suffering minimal distortion after traversing said scanning assembly.

9. The scanning assembly of claim 8, wherein said optical element is an infinity corrected microscope objective.

10. The scanning assembly of claim 8, wherein said first and second telescope eyepieces are Edmund Scientific Erfle telescope eyepieces, or Nagler telescope eyepieces.

* * * * *